Oct. 12, 1926. Re. 16,437
C. L. RAYFIELD
THERMAL CONTROLLED CIRCULATING SYSTEM
Original Filed Dec. 26, 1916
Fig. 1
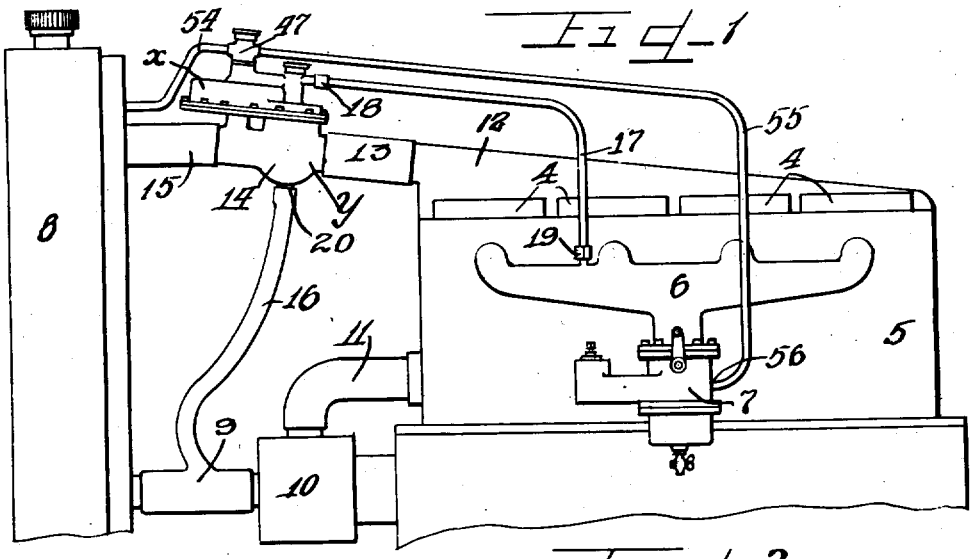
Fig. 2
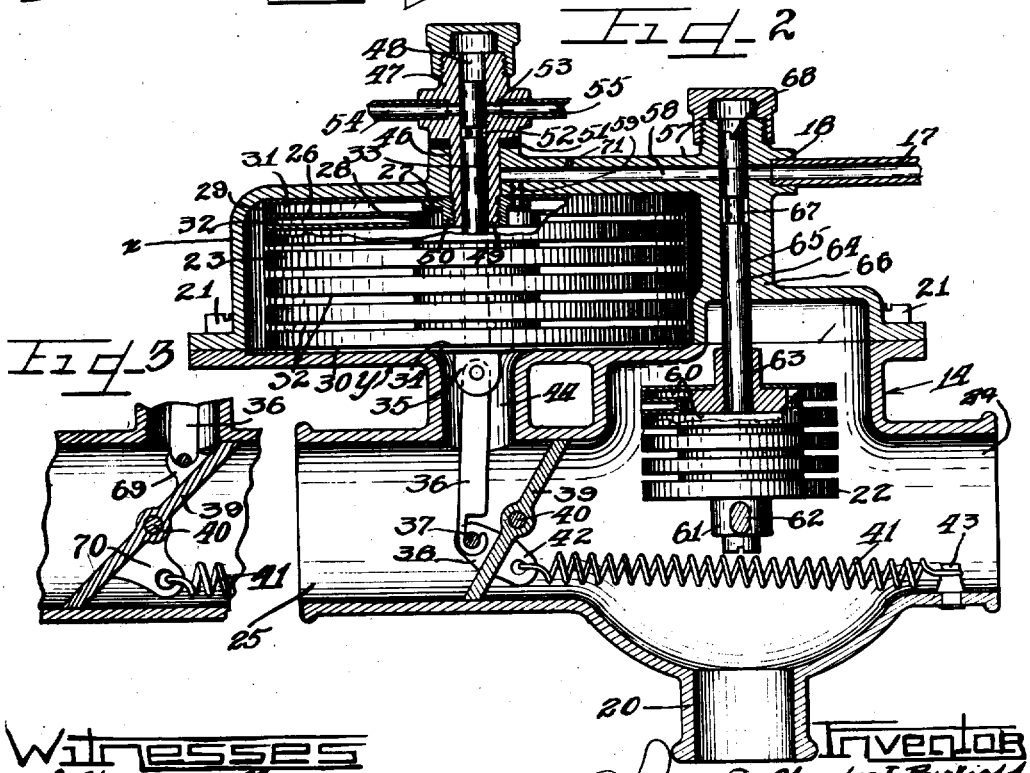
Fig. 3
Witnesses
J. W. Angell
Ouerton Hill
Inventor
Charles L. Rayfield
by Charles E. Hill Atty.

Reissued Oct. 12, 1926. Re. 16,437

UNITED STATES PATENT OFFICE.

CHARLES L. RAYFIELD, OF CHICAGO, ILLINOIS, ASSIGNOR TO BENEKE MANUFACTURING COMPANY, OF CHICAGO, ILLINOIS, A CORPORATION OF ILLINOIS.

THERMAL-CONTROLLED CIRCULATING SYSTEM.

Original No. 1,335,391, dated March 30, 1920, Serial No. 138,808, filed December 26, 1916. Application for reissue filed March 24, 1922. Serial No. 546,513.

My invention relates to an improvement in thermal-controlled circulating systems, particularly for internal combustion engines, and the objects of my improvements are, first, to provide a construction whereby to prevent a cooling medium circulating through the radiator of an automobile immediately the engine stops, to conserve the heat in the liquid which surrounds the engine cylinders, and thus obviate heat transfer from the cooling medium through the radiator to the atmosphere; second, to afford means for the regulation of the degree of heat at which a thermal element will make operable additional means for changing the path of travel of the cooling medium; third, the provision of thermal-controlled means to operate a valve to permit the passage of a force to actuate the additional means for operating a valve disposed in the path of travel of the cooling medium which additional means is operable only upon and after the cooling medium has reached a predetermined degree of heat and during the continuance in operation of the engine; fourth, the production of suitable parts to get the temperature of the engine cooling medium up to say 170 to 180 degrees Fahrenheit, as quickly as possible, and to maintain such temperature as being as long as possible after the engine is shut down; fifth, to produce a structure suitable to automatically supply water vapor or other fluid, after being heated, to the fuel mixture to prevent pre-ignition and to minimize carbonization of the motor.

With the above and other objects in view, my invention consists in the novel features, and in the novel mode of operation, and in the novel combination and arrangement of parts hereinafter fully described, illustrated in the accompanying drawings forming a part of this specification, and particularly pointed out in the claims hereunto appended.

Figure 1 is a side elevation of the front end of an automobile with the working parts assembled.

Figure 2 is a vertical central section with the parts shown in normal positions.

Figure 3 is a sectional detail of a modified form of mounting and operation of the valve in the cooling medium passage.

Like numerals refer to similar parts throughout the several views.

In the embodiment chosen to exemplify my present invention, broadly stated, there is an automobile gas engine of the water cooled type and a radiator with suitable pipe connections between the radiator and the liquid passages in the water jackets of the engine cylinders with thermal-controlled valve mechanism disposed in the liquid circuit and having a thermal-controlled member which at the predetermined temperature of the cooling medium renders operative a force to actuate an additional member to open a valve normally opposed to the passage of the cooling medium to or from the radiator. In cases where it may be desired the so-called "additional member" is employed to govern the flow of water vapor or other fluid through proper conduit from a source of liquid supply into a fuel mixing chamber.

The engine cylinders 4 are provided with water jackets 5, fuel intake manifold 6, carbureter 7, radiator 8, pipe 9, from the lower end of the radiator to the pump 10, water intake pipe 11 from the pump 10 to the water jacket 5, water outlet manifold 12, a section of flexible pipe 13, continuing the water outlet to and connected with a thermal-controlled valve-mechanism in the casing 14, and pipe 15, connecting the casing 14 with the upper end of the radiator 8, and a flexible by-pass pipe 16 connected to the nipple 20 of the device 14 at one end and attached at its opposite end to the pipe 9.

The pipe 17 is connected at the point 18 of the valve mechanism 14, and at 19 with the fuel intake manifold 6.

The casing 14 is composed of upper and lower portions X, Y, secured together through their externally flanged portions by screws 21 or other preferred means and the two portions afford suitable housing for the thermal element 22 and the mechanical element 23 contained therein.

The nipple 24 is formed at the intake end and the nipple 25 is formed at the discharge end of the lower portion Y of the casing 14, which, preferably is tubular in form and somewhat enlarged adjacent the position of the thermal element 22. The upper portion X of the casing 14 preferably is cylindrical to conform to the diaphragm or mechanical element 23.

For the performance of mechanical work, I employ what is termed a diaphragm or mechanical element 23 which preferably consists of a number of thin sheets or disks 26, preferably of flexible metal, each disk having an axial opening 27 therethrough, except the last one, and each disk having its inner edges 28 and outer edges 29 annularly flanged oppositely, and secured together at the inner and outer flanged edges, but in a manner free to yield to pressure on one side or the other, particularly to yield to the influence of a partial vacuum or the direct expansive force of a fluid under compression, after a slight modification of the structure herein set forth, for the purpose of utilizing the contraction or expansion of the element 23 to give movement to anything fixed to the last one 30 of the series of disks, especially to by-pass the cooling medium from the normal course through the radiator whenever the engine stopped; and, when desired, to govern the flow of water vapor or other fluid to be incorporated with the fuel mixture after such vapor or other fluid has reached a predetermined degree of heat.

On reference to the drawing, in Fig. 2, it will appear every other air chamber 31 is hermetically sealed, and every other open air space 32 will permit contraction and expansion of the hermetically sealed air chambers 31. The stem 33 is fixed at 34 to the outer surface of the disk 30 by solder, brazing or the like, and terminates in a flattened portion 35 to which is pivoted link 36 having its outer end 37 in operative engagement with the bell crank 38 which is carried by the butter-fly valve 39, fulcrumed at 40 in the walls of the tubular portion Y. A resilient member 41 is attached at one end to the arm 42 of the bell crank carried by the valve 39 and at the other end to the post 43 and constantly urges the valve 39 to closed position. The link 36 is movable in the opening 44.

The top wall of the portion X of casing 14 is provided with bore 46 to receive the plug 47 which has a bore 48 to receive the stem 33. The plug 47 is threaded at its lower end 49 and is made air tight by the employment of nut 50 and gasket 51.

Should the user want to introduce water vapor into the carbureter to be incorporated with the fuel mixture it is only necessary to extend upwardly the plug 47, form an annular recess 52 in the stem 33, form a passage 53 through the upper end of the plug 47, pipe communication 54 from the radiator to the passage 53 in the plug 47 and also provide pipe 55 from the passage 53 to the carbureter 7 at 56.

The rib 57 is bored to form the passage 58 which communicates with the interior of element 23 through aperture 59.

The hermetically sealed thermal element 22 is substantially of known construction of thermostat and the details for that reason are not set forth. Preferably it comprises a thin sheet metal spun hollow construction having a chamber 60 filled with a liquid having a high coefficient of expansion, such as alcohol or a more volatile liquid, if preferred. At its lower end there is a boss 61 fixed centrally to the outer end wall of the chamber 60 and supported by the rod 62 which is in engagement with the inner wall of the tubular portion of the part Y of the casing 14. The head 63 of the element 22 is in threaded engagement with the stem 64 which is mounted for movement in the bore 65 in the thickened wall 66 of the upper portion X of the casing 14. The bore 65 and the passage 58 intersect near the upward end of the former and the outward end of the latter. On sufficient expansion of the liquid in the element 22 stem 64 will be forced upwardly enough for the annular recess 67 to register with the passage 58. The element 22 being fixed at its lower end the stem 64 being mounted for movement in its bore, any sufficient expansion of the liquid in the element 22 will result in operation of the stem 64 as the movable member of a valve to govern the outward or inward flow of a fluid through the passage 58 and aperture 59. Immediately on sufficiently lowering the temperature of the liquid in the thermal element 22, contraction will ensue and the stem 64 will shut off ingress or egress of any force or influence upon the element 23 and the small perforation 71, in the wall of the passageway 58, will relieve the vacuum or pressure, as the case may be, in the element 23, and permit the power exerted by the resilient member 41 to close the liquid valve 39, and thus by-pass the cooling medium from entering the radiator 8.

By the use of a proper tool applied at 68, the stem 64 may be lengthened or shortened to change the degree of temperature at which the force necessary to operate the mechanical element 23 will be admitted into the passage 58 and through the aperture 59. Generally speaking, the cooling medium should be raised to from 170 to 180 degrees F. before the stem 64 and its annular recess 67 will register with the passage 58.

In the foregoing description I have disclosed a complete and operable construction comprising a valve 39, which is disposed in a liquid passage, mechanical means in operative relation to the valve, and a thermal element operative to admit and exclude a force to operate the mechanical element and its liquid valve 39. However, should the user automatically operate means to permit the introduction of water vapor or other fluid to the fuel mixture, it is only necessary to employ the plug 47 construction from the gasket 51 upward, as hereinbefore described, otherwise such construction of the plug 47 may be omitted without in any manner interfering with the proper functions of the other parts.

The pipe 17 which is connected at 19 in a manner to employ the force of partial vacuum or suction of the piston in the engine cylinders exerts a power to collapse the diaphragm or mechanical element 23 when not excluded by the stem 64 of the thermal element 22.

I do not limit my invention to the employment of such force but consider that I am entitled to the use of compressed air for the operation of the mechanical element 23 with slight modifications in the structure.

In Fig. 3 is a slightly modified form of the lower engaging end of the link 36 with the ear 69, and the apertured ear 70 of the valve 39 for attachment of the resilient element 41, when a fluid under compression is employed for operation of the valve 39.

In operation, when no vapor means is used or some other means for supplying vapor or other fluid to the fuel mixture is employed, the thermostat 22, and the mechanical element or diaphragm 23, constitute complete means for automatically operating valve means to by-pass a cooling medium from circulation through a radiator until the temperature of the liquid medium is raised to 170 to 180 degrees Fahrenheit or immediately the engine is stopped.

When the engine is first started the flow of the cooling medium is through the pump 10, pipe 11, water-jackets 5, outlet manifold 12, through nipple 24, imparting heat to the thermal element 22, and out through nipple 20, and through pipe 16 to the pump 10, and so on. When the expansive liquid within the element 22 is sufficiently expanded the stem 64 is moved enough to register the annular recess 67 with the passage 58 when the partial vacuum created in the pipe 17 by operation of the pistons in the engine cylinders, when the diaphragm 23 will collapse and open the valve 39, and the cooling medium will be permitted to pass through the radiator.

Obviously at once the engine is stopped the resilient member 41 will close the valve 39 and normal condition of the parts will again be estabished.

Should the user want to employ the movement of the stem 33 to govern the flow of water vapor or other fluid to the zone of fuel mixture, the plug 47 is formed as indicated, Fig. 2. When the influence of a partial vacuum exhausts the air from the interior of the diaphragm 23 through the passage 58 and the aperture 59, the stem 33 will be upwardly to a position of register of the annular recess 52 and the passage 53 through the plug 47, when a water vapor or other fluid from a source of supply will pass through the pipe 55 into the zone of fuel mixture to be incorporated with the fuel which passes from the carbureter into the intake manifold 6 into the engine cylinder or cylinders. Promptly on stopping the engine, the influence of vacuum will cease and the source of vapor or other fluid will be closed by the stem 33.

Should compressed air be preferred and the operation of the member 23 be reversed in addition to the changes in the structure shown in Fig. 3 of the drawings, the annular recess 52 in the stem 33 will be positioned above the passage 53 instead of below it as shown, and in such case a source of compressed air supply will be provided.

It will be noted I have provided means including a valve to permit the cooling medium to flow through an auxiliary channel when the engine is not in operation, instead of pursuing the usual or direct course through the main or normal channel.

It will be understood considerable variation and change is possible in the details of the construction thus specifically shown and described, and I do not intend by illustrating a single, specific or preferred embodiment of my invention to be limited thereto; my intention being in the appended claims to secure protection upon all the novelty there may be in my invention as broadly as the state of the art will permit.

I claim as my invention:

1. In a thermal-controlled circulating system, the combination of an engine cylinder and a water jacket therefor, fuel feeding means, means including a radiator for supplying a cooling medium to the water jacket, means including a valve to by-pass the cooling medium through an auxiliary channel when the engine is not in operation, a diaphragm normally inoperative and connected with the valve, and a thermal element having an independent valve for controlling the operation of the diaphragm.

2. In a thermal-controlled circulating system, the combination of a plurality of engine cylinders each having a water jacket therefor, fuel feeding means, means including a radiator for supplying a cooling medium to the water jackets, means including a valve to by-pass the cooling medium through an auxiliary channel when the engine is not in operation, a diaphragm normally inoperative and connected with the valve, a thermal element having an independent valve to control the passage of a force to operate the diaphragm.

3. In a thermal-controlled circulating system the combination of a plurality of engine cylinders each having a water jacket therefor, fuel feeding means, means including a radiator for supplying a cooling medium to the water jackets, means including a valve to by-pass the cooling medium through an auxiliary channel when the engine is not in operation, a diaphragm normally inoperative and connected to said valve, a source of power to operate the diaphragm and its valve and an independent thermal element to render operative said source of power to actuate said diaphragm.

4. In a thermal-controlled circulating system, the combination of a plurality of cylinders each having a water jacket therefor, fuel feeding means, means including a radiator for supplying a cooling medium to the water jackets, means for forcing the cooling medium through the water jackets of the cylinders, means including a valve to by-pass the cooling medium through an auxiliary channel when the engine is not in operation, a diaphragm normally inoperative and connected with the valve, a thermal element having a separate valve to control a force to operate the diaphragm.

5. In a thermal-controlled circulating system, the combination of a plurality of engine cylinders each having a water jacket therefor, fuel feeding means, means including a radiator for supplying a cooling medium to the water jackets, means for forcing the cooling medium through the water jackets of the cylinders, means including a valve to by-pass the cooling medium through an auxiliary channel when the engine is not in operation, a diaphragm normally inoperative and connected to said valve, a source of power to operate the diaphragm and its valve and an independent thermal element to render operative said source of power to actuate the diaphragm.

6. In a thermal-controlled circulating system, the combination of a plurality of engine cylinders each having a water jacket therefor, fuel feeding means, means including a radiator for supplying a cooling medium to the water jackets, means forcing the cooling medium through the water jackets of the cylinders, means including a valve to by-pass the cooling medium through an auxiliary channel when the engine is not in operation, a diaphragm normally inoperative and connected to said valve, a source of power to operate the diaphragm and its valve, a thermal element to render operative said source of power to actuate the diaphragm, means for supplying water vapor so as to be combined with the fuel mixture, and valve means carried by the diaphragm to govern the flow of water vapor to the fuel mixture according to heat conditions of the vapor.

7. In a thermal-controlled circulating system, the combination with a plurality of internal combustion engine cylinders each having a water jacket therefor and a radiator having cooling medium circulating connection with the water jackets of a casing having a plurality of outlets and having within a diaphragm normally inoperative, a valve within the casing and connected to the diaphragm, a source of power to operate the diaphragm and its valve, and a thermal element to render operative said source of power to actuate the diaphragm.

8. In a thermal-controlled circulating system, the combination with a plurality of internal combustion engine cylinders each having a water jacket therefor and a radiator and cooling medium circulating connection with the water jackets, of a casing having a liquid conduit therethrough, a valve in the conduit and normally spring closed, a diaphragm within the casing and in operative engagement with the valve, a source of power to operate the diaphragm and its valve, a thermal element to render operative said source of power to actuate the diaphragm and suitable means to supply such power.

9. In a thermal-controlled circulating system, the combination with a plurality of internal combustion engine cylinders each having a water jacket therefor and a radiator and cooling medium circulating connection with the water jackets, of a casing having a liquid conduit therethrough, a valve in the conduit, a resilient member mounted to constantly urge the valve to closed position, a diaphragm in operative engagement with the valve, and thermal operated means to admit and exclude a force to actuate the diaphragm.

10. In a thermal-controlled circulating system, the combination with a plurality of internal combustion engine cylinders each having a water jacket therefor and a radiator and cooling medium circulating connection with the water jackets, of a casing having a conduit therethrough, a valve in the conduit, a diaphragm in operative engagement with the valve, a fluid passage from the interior of the diaphragm outwardly, a thermal element, within the casing, having a valve stem in threaded engagement therewith and intersecting said fluid passage to control a force through said passage to operate the diaphragm.

11. In thermal-controlled valve means, a diaphragm operable by partial vacuum, means to exhaust the air from the diaphragm and an independently operable thermal element carrying the movable member of a valve, for controlling the operation of the diaphragm.

12. In thermal-controlled valve means, a casing having a liquid conduit therethrough and a plurality of liquid outlets, a diaphragm and a thermal element within the casing and a source of power to operate the diaphragm.

13. In thermal-controlled valve means, a casing having a liquid conduit therethrough and a plurality of outlets therefrom, a valve in the conduit, means to constantly urge the valve to closed position, a diaphragm in operative engagement with the valve, a fluid passage from within the diaphragm to the outside of the casing, a thermal element having valve means to control the flow of a fluid through said passage to operate the diaphragm and its valve.

14. In thermal-controlled valve means, a casing having a conduit therethrough, and a plurality of outlets therefrom, a valve in the conduit, means to constantly urge the valve to closed position, a diaphragm in operative engagement with the valve, a fluid passage from within the diaphragm to the outside of the casing, pipe connections between the fluid passage and means to provide a partial vacuum and a thermal element having valve means to control the flow of a fluid through said passage to operate the diaphragm and its valve.

15. In thermal-controlled valve means, a casing having a conduit therethrough, a valve disposed in the conduit, means to constantly urge the valve to closed position, a diaphragm within the casing and in operative engagement with the valve, a fluid passage from within the diaphragm to the outside of the casing, pipe connections between the fluid passage and a source of force to operate the diaphragm, and a thermal element fixed at one end within the casing and having a movable part of a valve at the other end to control said passage.

16. In thermal-controlled valve means, a casing having a conduit therethrough and a plurality of outlets therefrom, a valve disposed in the conduit, means to constantly urge the valve to closed position, a diaphragm within the casing and in operative engagement with the valve, a fluid passage from within the diaphragm to the outside of the casing, pipe connections between the fluid passage and a source of force to operate the diaphragm and a thermal element fixed at one end within the casing and having a movable member of a valve adjustably secured at the other end to predetermine the degree of temperature at which the diaphragm is effective.

17. In thermal-controlled valve means, a casing having a conduit therethrough, a valve disposed in the conduit, means to constantly urge the valve to closed position, a diaphragm within the casing and in operative engagement with the valve, a fluid passage from the diaphragm to the outside of the casing, pipe connections between the fluid and a source of force to operate the diaphragm, a thermal element fixed at one end within the casing and having the movable member of a valve for said passage carried by the other end, and a source of force to operate the diaphragm.

18. In a device of the class described, the combination of an engine having a cylinder and a cooling fluid chamber around the cylinder, means for supplying a cooling fluid to the chamber, a motor operable to regulate the temperature of the cooling fluid in the chamber, and a valve automatically controlled for regulating the motive power supplied to the motor.

19. In a device of the class described, the combination of an engine having a cylinder and a cooling fluid chamber around the cylinder, means for supplying a cooling fluid to the chamber, a thermostat energized by the heat from the engine cylinder, a differentially energized motor for regulating the temperature of the cooling fluid in the chamber, and a valve operated by the thermostat for controlling the energy supplied to the differentially energized motor.

20. In a device of the class described, the combination of an engine having a cylinder and a cooling fluid chamber around the cylinder, means for providing a cooling fluid to the chamber, a motor adapted to be energized to regulate the temperature of the cooling fluid to the chamber, and an automatically operated valve for controlling the energizing of the said motor.

21. In a device of the class described, the combination of a cooling fluid duct, a valve therefor, a motor at one side of the valve for operating the valve, and a thermostat at the other side of the valve for controlling the operation of the motor.

22. In a device of the class described, the combination of a cooling fluid duct, a valve therefor, a thermostat, and independently operable mechanism controlled by the thermostat for actuating the valve.

23. In a device of the class described, the combination of an engine and its carbureter, means for supplying a cooling fluid to the engine, a thermostatic device for regulating the temperature of the cooling fluid, and means co-operating with the said thermostatic device for regulating the fuel mixture supplied to the engine by the carbureter.

24. In a device of the class described, the combination of an engine and its carbureter, a jacket for said engine for providing a cooling fluid chamber, means for supplying a cooling fluid to said chamber, a thermostat for controlling the temperature of the cooling fluid in the chamber, means for supplying an ingredient to be combined with the fuel mixture furnished by the carbureter, and means controlled by said thermostat to regulate the supply of said ingredient.

25. The combination with an internal combustion engine and the cylinder walls thereof, of means for maintaining said cylinder walls at a safe and efficient operating temperature, said means comprising means for radiating heat conducted from said engine into the surrounding atmosphere, means responsive to the suction created by the engine during its normal operation for varying the operation of said radiating means, a conduit for connecting said suction responsive means with the source of suction, and thermo-responsive means for controlling the passage through the conduit.

26. The combination with an internal combustion engine and the cylinder walls thereof, of means for maintaining said cylinder walls at a safe and efficient operating temperature, said means comprising means for radiating heat conducted from said engine into the surrounding atmosphere, thermo-controlled means responsive to suction created by the engine during its normal operation for varying the operation of said radiating means, and means adapted to position said suction responsive means to render the radiating means least effective when the engine is stopped.

27. The combination of an internal combustion engine, a cooling system therefor, means for controlling the cooling capacity of said system, means directly responding to suction produced in the engine cylinders for actuating the controlling means, and a thermostatic device governing the operation of the means responding to suction.

28. The combination of an internal combustion engine, a cooling system therefor including a radiator, means for controlling the cooling effect of the radiator, means directly responding to suction produced in the engine cylinders for actuating the controlling means, and a thermostatic device governing the operation of the means responding to suction.

29. The combination with an internal combustion engine and the cylinder walls thereof, of means for maintaining said cylinder walls at a safe and efficient operating temperature, said means comprising means for radiating into the surrounding atmosphere heat conducted from said engine, means responsive to the suction created by the engine during its normal operation for varying the operation of said radiating means, and thermo-responsive means for controlling the effect of said suction on said suction responsive means.

In testimony whereof, I have hereunto subscribed my name.

CHARLES L. RAYFIELD.